United States Patent
Dillmann et al.

[11] Patent Number: 5,091,144
[45] Date of Patent: Feb. 25, 1992

[54] BWR ZERO PRESSURE CONTAINMENT

[75] Inventors: Charles W. Dillmann, Morgan Hill; Harold E. Townsend, Campbell; Loyd B. Nesbitt, San Jose, all of Calif.

[73] Assignee: General Electric Company, San Jose, Calif.

[21] Appl. No.: 560,410

[22] Filed: Jul. 30, 1990

Related U.S. Application Data

[63] Continuation-in-part of Ser. No. 553,073, Jul. 10, 1990.

[51] Int. Cl.$^5$ .............................................. G21C 13/00
[52] U.S. Cl. ................................. 376/283; 376/293; 376/309
[58] Field of Search ................. 376/314, 293, 309, 283

[56] References Cited

U.S. PATENT DOCUMENTS

| | | | |
|---|---|---|---|
| 4,816,210 | 3/1989 | Henry | 376/309 |
| 4,950,448 | 8/1990 | Gou et al. | 376/283 |

FOREIGN PATENT DOCUMENTS

| | | | |
|---|---|---|---|
| 1180198 | 9/1986 | Japan | 376/314 |
| 62-44687 | 11/1989 | Japan | 376/283 |

*Primary Examiner*—Brooks H. Hunt
*Assistant Examiner*—Frederick Voss
*Attorney, Agent, or Firm*—R. R. Schroeder

[57] ABSTRACT

The wetwell space in a suppression pool of a nuclear reactor containment is continuously ventilated by exhausting gas therefrom, while at the same time, during normal system operation atmospheric air from a source of same is admitted to the wetwell but such admission being blocked during a LOCA. All exhaust flow from the wetwell is conveyed through a conduit that outlets at a remote elevated location in the atmosphere. All exhaust flow through the conduit is before outletting therefrom passed through gas treatment operation wherein any particulates in the gas mixture are removed. Further treatment of the gas with charcoal to adsorb noble gases can be carried out. In normal reactor operation the ventilation flow rate is at minimal level. However on occurrence of a loss-of-coolant-accident, highly heated gases from the containment drywell are passed into the suppression pool where condensables condense while non-condensable gases are cooled and vent to the wetwell. Fission products are scrubbed in the pool and much retained therein. The ventilation rate increases during LOCA to carry off the increased non-condensable gas mixture volume created by the LOCA and, because the conduit is such sized, containment drywell pressure during the LOCA, is maintained at a level not to exceed about one atmospheric gauge. This allows that containment structures can be of lighter weight than heretofore and enclose more components such as turbine units and condensers.

34 Claims, 2 Drawing Sheets

BWR ZERO PRESSURE CONTAINMENT

This is a continuation-in-part of application Ser. No. 07/553,073, filed July 10, 1990, by Larry E. Fennern et al and entitled "Nuclear Reactor With Bi-Level Core".

BACKGROUND OF THE IVNENTION

The present invention relates to nuclear system Boiling Water Reactor (BWR) containments and, refers more particularly to such a reactor containment in which a suppression pool wetwell space is continuously ventilated, as well as a method for ventilating such containment, to remove non-condensable gases from the wetwell space so that during a loss-of-coolant-accident, drywell space pressure can be maintained at not above about one atmosphere gauge pressure thereby allowing use of lighter weight containment structures, as well as enclosure of more components within the containment.

Nuclear system nuclear reactors are housed in containment enclosures as accident mitigation structures. These structures generally are designed as high pressure buildings surrounding the reactor system to function to contain all fluid and fission products which release upon occurrence of a reactor loss-of-coolant-accident (LOCA). Efforts to improve these containment designs have been ongoing and in recent years system improvements proposed include, inter alia, addition of a high-pressure relief line with a filter system to trap particulate fission products as non-condensable gases are released to relieve pressure. Still, all past containment designs require a high pressure enclosure around the reactor system to collect the energy, fluids and fission products released incident a LOCA. These containment buildings in turn require isolation systems for process lines and penetrations through the containment boundary, and they are complex and expensive mandating use of as compact a structure as possible.

OBJECTS AND SUMMARY OF THE INVENTION

Accordingly, it is an object of the invention to provide a continuously ventilated reactor containment and a method for ventilating the containment which overcomes the drawbacks of the prior art.

It is a further object of the invention to provide a continuously ventilated reactor containment which can be significantly reduced in containment structure weight to lightweight values since the containment even during a LOCA, will be exposed to a pressure of not above about one atmosphere gauge.

It is a still further object of the invention to provide a nuclear reactor containment which because it is continuously ventilated and thus of lighter weight than prior containments, can be used to contain in addition to the reactor vessel, other system components inclusive of a turbine unit and associated equipment.

Briefly stated, there is provided a nuclear reactor containment wherein the wetwell space above a suppression pool of a nuclear reactor containment is continuously ventilated by exhausting gas therefrom, while at the same time during a normal operation, atmospheric air from a source of same is admitted to the wetwell, but such admission being blocked during a LOCA. All exhaust flow from the wetwell is conveyed through a conduit that outlets at a remote elevated location in the atmosphere. All exhaust flow through the conduit is before outletting therefrom, passed through a gas treatment operation wherein any particulate, particularly fission material, in the gas mixture are removed. Further treatment of the gas with charcoal to adsorb noble gases can be carried out. In normal reactor operation the ventilation flow rate is at minimal level. However on occurrence of a loss-of-coolant-accident, highly heated gases from the containment drywell are passed into the suppression pool where condensables condense, while non-condensable gases are cooled and vent to the wetwell. Fission products are scrubbed in the pool and much of same are retained therein. The ventilation rate increases during LOCA to carry off the increased non-condensable gas mixture volume created by the LOCA and, because this conduit is such sized, containment drywell pressure during LOCA is maintaineed at a level not to exceed about one atmosphere gauge. This allows that containment structures can be of lighter weight and different shapes than heretofore, and enclose more components such as turbine units and condensers.

In accordance with these and other ojects of the invention, there is provided a method of operating a reactor system having a vented wetwell, comprising continuously venting the wetwell during normal operation so as to maintain a substantially constant pressure differential between the wetwell and the atmosphere with the vented gases being filtered to remove entrained particles. In this way, the integrity of an incorporating containment can be better preserved during a pressurization.

In accordance with a feature of the invention, there is further provided in the operation of a nuclear reactor system, which system includes a containment defining a drywell space wherein a nuclear reactor is disposed, there being a suppression pool in the containment with the suppression pool having a wetwell space above a level of the pool to which any non-condensable gases entering the suppression pool can vent, a method of continuously ventilating the containment. By this method, continuous exhausting of the wetwell space to remove gas therefrom is carried out, while concurrently an inflow of air from an atmospheric source thereof is admitted to the wetwell during normal opertion but blocking off said inflow during a loss-of-coolant-accident whenever a pressure in the wetwell space is above a predetermined value. The gas exhausted from the wetwell space is subjected subsequent to its removal from that space, to a treatment operation to separate any particulate material entrained therein from the gas.

In accordance with a further feature of the invention, there is still further provided in a nuclear system comprising a nuclear reactor which includes a reactor pressure vessel, and a reactor core situated in the pressure vessel, means enclosing space defining a containment in which the nuclear reactor is disposed. The containment includes a drywell space, structure therein for holding a suppression pool of water and which defines a wetwell space above a level of the water, with the wetwell space separated from the drywell space. Means are provided for maintaining a continuous exhaust flow of gas mixture from the wetwell space to remove gas therefrom, as is means for continuously admitting air from an atmospheric source thereof to the wetwell space during normal opertion but such means being operable to block air admission to the wetwell space during a loss-of-coolant-accident whenever a pressure in the wetwell is above a predetermined value. Conduit means communicate an entry end of the conduit with the wetwell space and this conduit means extends to an opposite outlet end located exteriorly remote from the containment and elevated above the containment. Gas treatment means is disposed in the conduit means for treating the gas to separate any particulate matter entrained therein from the gas.

A still further invention feature provides a nuclear system comprising an array of operating components including, a nuclear reactor having a reactor pressure vessel and a reactor core in the vessel, a turbine unit, a condenser receiving an exhaust of steam from the turbine unit and converting it to a condensate, and means for feeding a flow of condensate to the reactor vessel, all disposed in common containment drywell space defined by an enclosure structure. The enclosure structure includes a structure part comprising a suppression pool housing separated from the drywell space, with this housing containing a pool of water, there being a wetwell space in the housing above a level of the water pool. Means define a flow connection between the drywell space and a submerged location in the water pool, with means being provided for maintaining a continuous exhaust flow of gas mixture from the wetwell space to remove gas mixture. Means continuously admit atmospheric air from a source thereof to the wetwell space during normal operation but such means being operable to block air admission to the wetwell space during a loss-of-coolant-accident whenever pressure within the wetwell space is above a predetermined value, and a conduit communicates at an entry end thereof with the wetwell space and extends to an outlet end located exteriorly of the containment. Gas treatment means are disposed in the conduit for treating the gas to separate any particulate matter entrained therein from the gas.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention deals with containment structures/spaces for nuclear reactor systems of the boiling water reactor type although same could be used in other types of nuclear reactor installations.

Described below is such a system, the system embodying operating procedure and means for effecting same that continuously are involved in normal system operation, but with the happening of a LOCA, respond fully and simply to control the incident without compromise of the effectiveness of event mitigation heretofore expected of heavier, more complex and expensive containments.

Figures 1, 5:
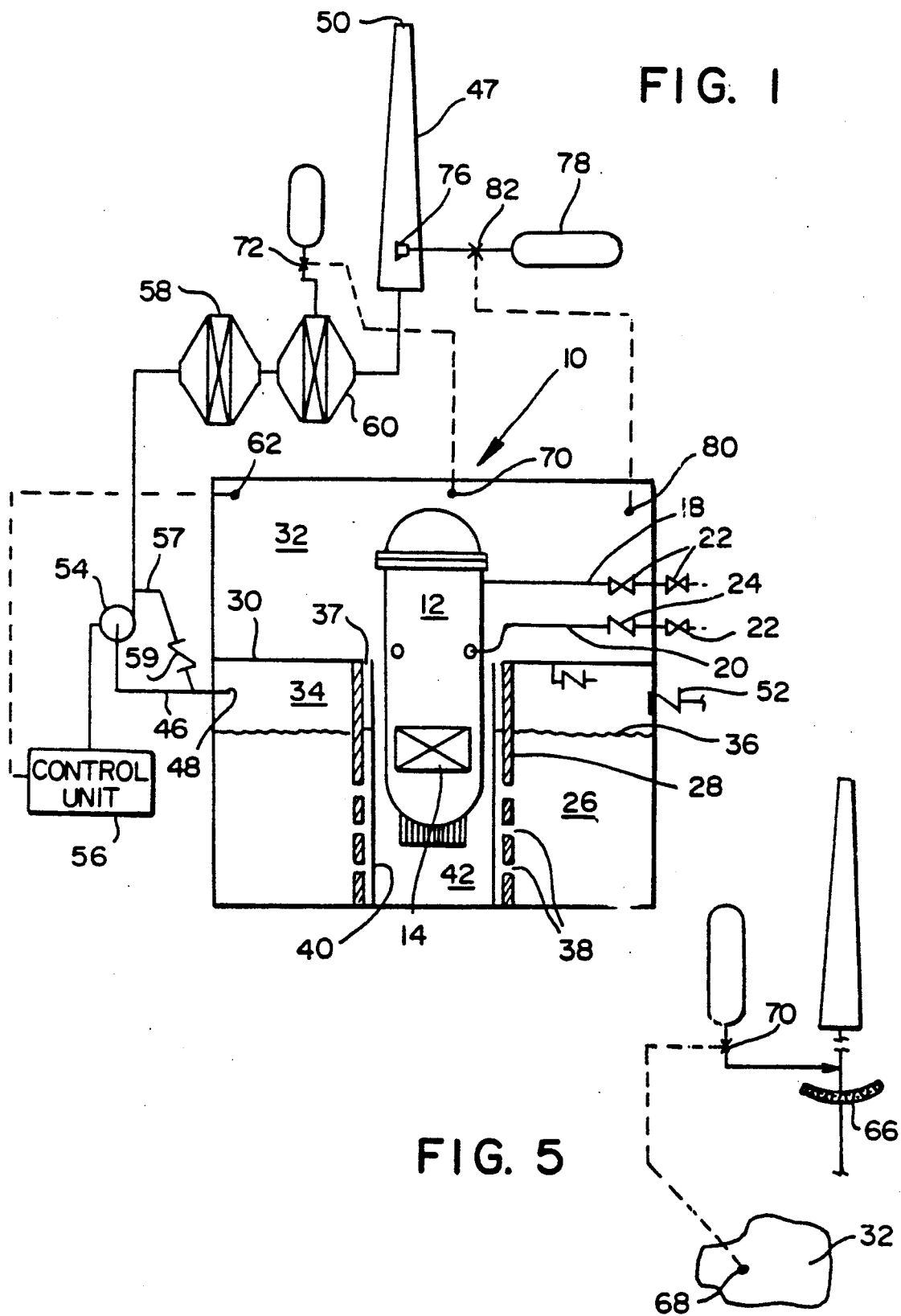
FIG. 1 is a schematic depiction of a nuclear reactor containment constructed in accordance with the principles of the present invention.
FIG. 5 is a fragmentary showing of a foraminous filter element used in the ventilation conduit for removing fission particulate from the gas mixture removed from the wetwell space, the filter element being continuously wetted during a LOCA with a fission particle absorbing solution.

Referring to FIG. 1, containment structure 10 comprises a lightweight containment building in which is contained a nuclear reactor, the nuclear reactor including a pressure vessel 12 and a reactor core 14 disposed within the pressure vessel and used to create the energy from and with which steam is generated in the pressure vessel, the main expanse of space within the containment being understood as constituting a containment drywell 32 more about which will be discussed later. The nuclear reactor is a BWR type and it includes some components which are not shown in the drawing, for example, a control rod assembly, but which one skilled-in-the-art recognizes as being a necessary component in the depicted environment.

The pressure vessel has appurtenant thereto, a main steam line 18 which in the particular embodiment of system here considered, penetrates the boundary of the containment and course to a turbine unit (not shown) for power conversion of generated steam to other useful forms of energy, there being the tandem presence of a feedwater line 20 penetrating the containment and returning a feedwater supply of elsewhere condensed and deaerated condensate recovered from the turbine steam exhaust side.

Since these lines penetrate the containment, they include therein, shut off or isolation valves 22 located at each side of the containment boundary, the valve 24 in the feedwater line being a check valve. Where these lines penetrate the containment, the joints of line pass through are pressure tight barriers barring flow through the joint in keeping with the common practice of optimized isolation construction precluding possibility of LOCA fluid outflow from the containment. As will be understood though, the present invention lessens the degree of joint resistance to flow-through requirements here involved since LOCA pressures in the containment will not identify with the levels for which prior containments have been designed.

Within thhe containment structure 10, other structure defining a suppression pool in which may be confined a suppression pool of water 26 is provided, this other structure in a particular form as shown, including the containment as a part and a further encircling wall 28 which is topped with a ceiling wall 30 that separates the drywell environment 32 of the containment from the headspace or wetwell space 34 situated above a level 36 of the water in the suppression pool. The encircling wall 28 includes a number of openings 38 therethrough which provide communication of the water pool 26 and a channel 37, e.g., of annular shape defined by the outer surface of wall 28, and the outer surface of a, e.g., cylindrical drywell vent duct member 40. In the depicted containment, the drywell includes a lower space region 42 and the pressure vessel is partly disposed in region 42 and in position wherein the duct member 40 encircles it.

As will be seen, the flow path communicating the drywell space with the wetwell includes the channel 37 so that on occurrence of a LOCA, the heated fluid released into the drywell space must flow into the suppression pool via channel 37. Such heated fluid will include steam, water vapor, nitrogen normally inerting the drywell, as well as noble gases issuing from the core material. Additionally, fission particles will carry over as an entrainment in the heated fluid. The vent duct member 40 is sized to define a channel 37 sized to insure that pressure in the drywell space 32 never will rise significantly during release of heated fluids into the drywell space during a LOCA.

The containment 10 also is penetrated by an exhaust conduit 46, communicating at an entry thereto as at 48 with the wetwell and thence coursing away fom and upwardly of the containment for some distance so that an outlet end of the conduit as at 50 is elevated some distance above the containment, this outlet discharging flow to the atomsphere. Another penetration is represented by one or more inlets 52 which communicate the wetwell with outside air as a source flow of ventilating air that enters and is exhausted from the wetwell as will be described in some more detail later. The inlets 52 are provided, e.g., as devices which during normal system operation are open, but on advent of a LOCA and where wetwell space pressure increases above a predetermined value, the inlets close to prevent blowout of wetwell space gases and entrained fission particles to the atmosphere. The inlets can in one form, be check valves under a predetermined loading The conduit has interposed therein, a forced draft fan 54, and a fan control unit 56 also can be provided, as can a conduit fan bypass leg 57.

Conduit 46 also has additional components disposed therein downstream of the fan location. These include a gas treatment unit 58 and an additional gas treatment unit 60, each of which is described in more detail below. Further downstream of the treatment units, the conduit assumes a terminal section length configured as a stack 47, a stack being beneficial to draft creation and particularly so since the system can or, if necessary operate on a natural draft basis.

During normal system operation, a sweeping ventilation flow in the wetwell is continuously sustained. Thus any gas mixture (normally air) will be exhausted from the wetwell space and an inflow of atmospheric air from a source thereof enters the wetwell space. This normal ventilation flow will be low level and the operation of fan 54 will be at a handling rate reflecting this.

During normal state operation, the drywell space is not affected as to its normal atmosphere, although circulation flow of the drywell atmosphere as a drywell temperature control expedient may be practiced. With normal operation, exhaust from the wetwell space will transit the conduit 46 and outlet therefrom, the gas having passed through the treatment units not withstanding that fission particles may not be present in the gas mixture.

With the happening of LOCA, e.g., as might be a break in the main streamline at or proximal the pressure vessel or a rupture in the pressure vessel shell, the drywell will be invested with highly heated fluid accompanied with pressure increase in the drywell space. But this heated fluid will vent to the suppression pool wherein the condensable fraction of the fluid will condense and be taken up in the pool water. The non-condensable gasses will be cooled in the pool but will vent to the wetwell space. Further, the inflow to the suppression pool is scrubbed and significant transfer of fission particles to the pool water will take place although some particulate form fission product can be expected to carryover to the wetwell as entrainment in the non-condensable gas mixture vented thereto.

The wetwell space pressure (which during normal operation is about atmospheric pressure) will also increase but this pressure will not unduly rise as the pressurized non-condensable gasses will vent from the wetwell space through the conduit 46. Under the circumstances of the LOCA, fan unit 54 may continue to operate, or it may be depowered to freely rotate under impetus of venting gas flow, or if the velocity of the venting gas from the wetwell space would cause unsafe rotational fan speed, the venting gasses can be bypassed around the fan through conduit bypass leg 57. This bypass leg can be self-initiated by using a spring-loaded check valve 59 in leg 57 set to operate open when wetwell space pressure exceeds a preset value and one that represents danger to the fan unit. Other means of effecting diversion of non-condensable gas flow through the leg also could be employed.

In dealing with the venting of the wetwell space during a LOCA, the conduit is sized to handle the expected venting flow to insure that the drywell space pressure does not exceed about one atmosphere gauge pressure. Further, the conduit is also designed to maintain non-condensable gas outflow therethrough that is consonant with achievement of optimized filtering efficiency in regard to the operatoin of the gas treatment units 58, 60.

Radioactive particle detecting sensor 62 located in the drywell space can be connected to fan control unit 56 to operate fan 54 in special manner attending special circumstances, e.g., when it is desired to speed up removal of wetwell ventilation rate after the LOCA to aid in clearing the containment for worker entry as well as operating the fan in such manner needed to maximize wetwell habitability.

From the foregoing, it is seen that drywell pressure can be limited during a LOCA to be not more than about one atmosphere gauge and in this manner, containment structure can be made lightweight in comparison to past practice.

The gas exhausted from the wetwell space 34 on passing downstream of fan unit 54 will enter the gas mixture treatment unit 58 wherein any fission particulates as carried over from the suppression pool are separated from gas stream. Unit 58 for such purpose comprises a filter containing gravel as a medium by which the fission particles are caused to be plated out, absorbed or otherwise removed from the gas mixture. The gravel can, e.g., be of pebble size. Another separating agent can be particulate size zeolite or synthetic zeolite.

Other forms of treatment unit and treatment agent can also be used and as depicted in FIG. 5. The treatment unit therein depicted is a foraminous or screen member 66 which during a LOCA event is continuously wetted with a fission particle absorbing solution, for example, a solution of sodium thiosulfate. The screen member 66 can have the catenary profile characteristic of this type of filter device. In normal operation, no screen wetting is needed or provided. However on happening of a LOCA, radiation sensor 68 signals a control valve 70 at a stock tank of sodium thiosulfate to open so that same can flow in wetting cascade onto the screen member 66.

While the treatment units 58 or 66 are effective for fission particle removal from the gas stream, they are not able to deal with noble gas removal from the gas stream. Noble gas removal is the function of the additional gas mixture treatment unit 60. This unit can comprise a housing packed with particulate form charcoal through which the gas stream flow is directed so that the noble gases are adsorbed by the charcoal. Under normal system operation, the charcoal is maintained at general environment temperature level. However on advent of a LOCA and to enable the charcoal to better deal with removal of noble gases, it may be necessary to cool the charcoal to a cryogenic temperature level.

One manner of doing this is to flow liquified nitrogen gas through the treatment unit. In one form, the unit 60 has charcoal packed therein and a mass of closely arrayed tubes passes through the charcoal. On happening of a LOCA, radiation sensor 70 signals valve 72 to open and allow liquid nitrogen to flow from a tank thereof to treatment unit 60 wherein the liquid nitrogen enters and passes through the closely arrayed tubes but these being so numerous and close to each other and the charcoal, that the charcoal can readily be cooled to cryogenic or near cryogenic condition.

Exhaust conduit 46 will for major length thereof and leading to the ultimate outlet point, be a stack structure 47 tapering inwardly in the usual manner as this shape enhances gas flow velocities. Increasing velocity of the gas stream facilitates high lift of the gas into the atmosphere. As noted earlier, gas flow need not be induced by forced draft means. It could in many instances be a natural draft induced flow. During a LOCA, wetwell space pressure will be above zero atmosphere gauge by some measure of, e.g., up to about one atmosphere gauge, pressure sufficient to produce the required draft inducing pressure differential between the wetwell space and the atmospheric pressure at the outlet of conduit 46.

Where natural draft ventilation is practiced, and as an additional draft promotion source in a forced draft system, a torch unit 76 as shown in FIG. 1 is mounted interiorly of the stack, this torch unit being connected with a source 78 of a fuel. Upon a LOCA happening in a natural draft system or in a forced draft system where a fan failure occurs, e.g., due to a power low attending the LOCA, a radiation sensor 80 can signal the valve 82 to open and allow fuel flow to the torch. Ignition of the fuel can be supplied by a battery powere igniter and the result is a combustion of fuel in the stack with release of thermal energy to increase draft level.

It was noted earlier that prior containments have the disadvantage that commonly only the reactor vessel is present in the containment and as a consequence numerous penetrations of the containment must be made for steamlines, feed water lines and other devices associated with other components such as turbine units, condensers, feedwater pumps, etc.

Figure 2:
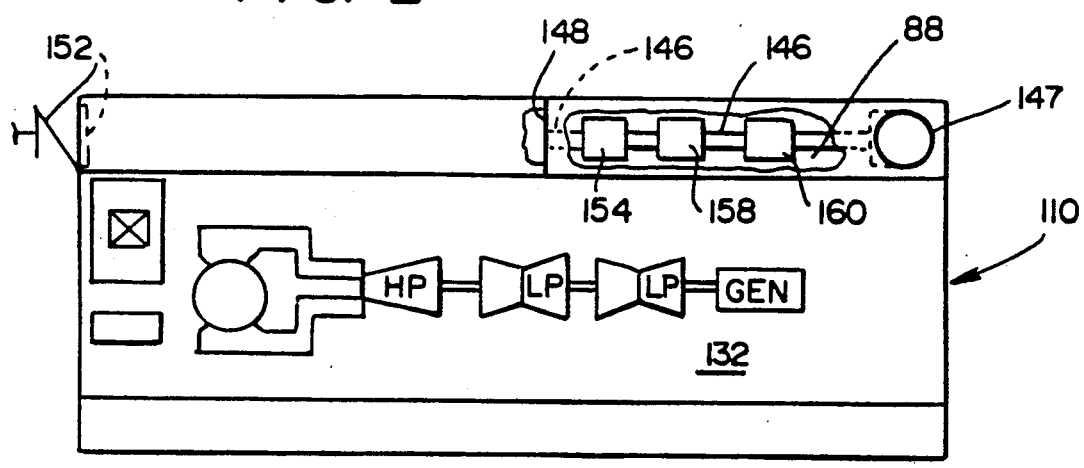
FIG. 2 is a schematic side elevational depiction of a containment similar to that shown in FIG. 1 wherein additional to the nuclear reactor, the turbine unit, condenser and feedwater system components associated with the reactor are also disposed in the containment, some parts of the containment structure being cut away for purpose of depicting other containment constructional details.
Figure 3:
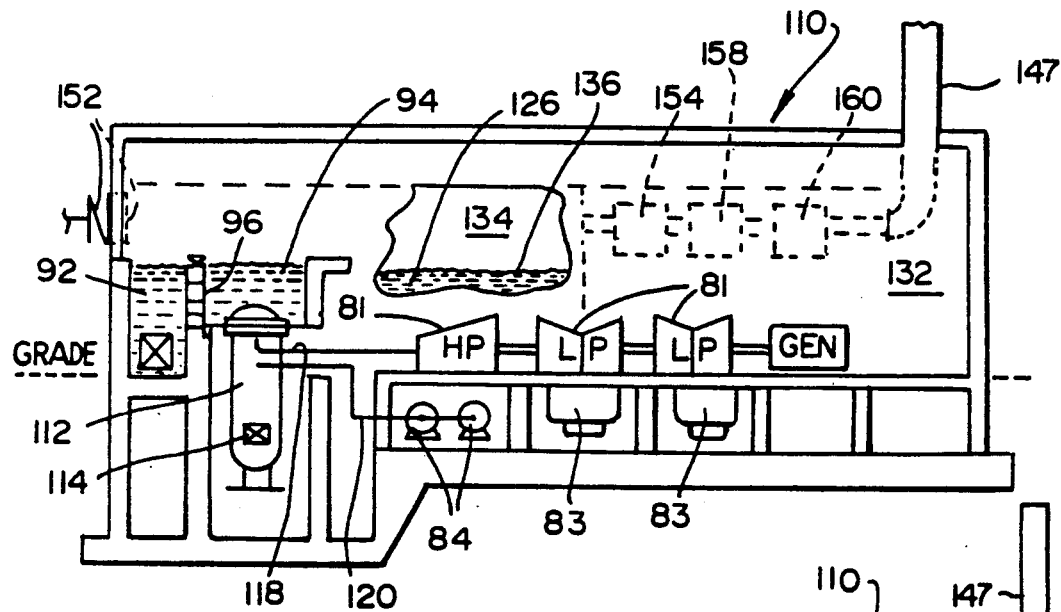
FIG. 3 is a top plan view of the FIG. 2 containment.
Figure 4:
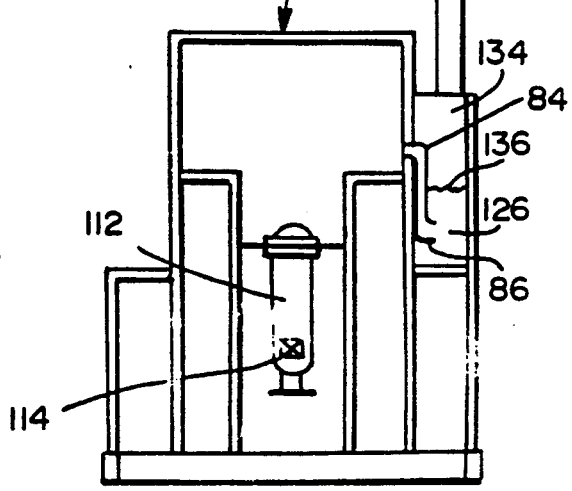
FIG. 4 is a left end elevational view of the FIGS. 2 and 3 containment.

The present invention allows for confinement of these other components in the same drywell space as the reactor, principally because in reducing to below about one atmosphere gauge pressure, any drywell space pressure expected to ensue during a LOCA, the containment structure can be made lightweight and hence readily enlarged structurewise to accommodate in a single space these operating components. Further amplification on this point will be given next and with reference to FIGS. 2-4.

Where applicable in FIGS. 2-4 elements common to the FIG. 1 containment are referenced with the same numerals prefaced with a "1". Referring to FIGS. 2-4, containment structure 110 is elongated and laterally widened reflecting the space provision therewith provided for reception in the structure enclosed drywall 132 of the pressure vessel 112 containing core 114, turbine units 81, condensers 83 to which the turbines exhaust steam and feedwater equipment including pumps 84, feedwater lines 120 for returning condensate to the pressure vessel, and main steamline 118.

The containment structure includes a structure part defining a suppression pool housing containing a pool of water 126, there being a water level 136 above which is wetwell space 134. The wetwell space 134 communicates with the drywell space 132 via pipes 86 having entry ends in the drywell and outlet ends submerged in pool 126. During a LOCA, the drywell will vent heated fluids to the suppression pool through these pipes 86.

The wetwell space contains atmospheric air inlets 152 disposed at one end thereof, and at the opposite end, an exhaust pipe 146 has inlet entry thereto in the wetwell space as at 148. Adjacent the wetwell housing structure, which is a part of the containment, is a bay section 88 which is not. This bay section 88 provides space for holding forced draft fan 154, gas mixture treatment units 158, 160 and the continuation section of exhaust pipe 146 that connects in flow communication with the stack 147.

During normal operation, continuous ventilation flow sweeping out of the wetwell space is maintained. On happening of a LOCA, venting of non-condensable gasses from the wetwell space and post wetwell handling of them will be in the same manner as given above in connection with the FIG. 1 containment and to the extent to insure drywell space pressure stays at a level below about one atmosphere gauge.

One skilled-in-the-art readily sees the advantage of this containment and the benefit derived from being able to contain all the operating components shown in a single lightweight structure, not the least being elimination of containment boundary penetration by pipes etc used with the components. The containment 110 also embodies a fuel storage pond of water 92, and a pressure vessel shielding water pool 94 separated from pond 92 by a leak-tight gate 96, both such being of use purpose and construction known in the art.

As one skilled-in-the-art will readily appreciate, inlets 52, 152 and bypass leg check valve 57 are denominated as such herein in generic sense of being selectively flow blocking or flow passing means depending on given system functions and needs. It should be understood that actual system embodiments of same can be constituted as dampers and the like and various controlling devices can be connected therewith to effect movements of same to open or closed positions as required.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In the operation of a nuclear reactor system, said system including a containment defining a drywall space wherein a nuclear reactor is disposed, there being a suppression pool in the containment with the suppression pool having a wetwell space above a level of said pool to which any non-condensable gases entering the suppression pool can vent, the method of continuously ventilating the containment comprising continuously exhausting the wetwell space to remove gas mixture therefrom while admitting inflow of air from an atmospheric source thereof to said wetwell during normal operation but blocking off said inflow during a loss-of-coolant-accident whenever a pressure in the wetwell space is above a predetermined value, and subjecting the gas subsequent to its removal from the wetwell to a treatment operation to separate any particulate material entrained therein from the gas mixture.

2. The method of claim 1 in which the gas treatment operation comprises passing the gas mixture through a gravel bed.

3. The method of claim 2 in which the gravel is pebble size.

4. The method of claim 1 in which the gas treatment operation comprises passing the gas mixture through a particulate form of one of zeolite and synthetic zeolite.

5. The method of claim 1 in which the gas treatment operation comprises passing the gas through a foraminous member wetted with a fission particle absorbing solution.

6. The method of claim 5 in which the solution is sodium thiosulfate.

7. The method of claim 1 in which the gas treatment operation includes an additional treatment step of passing the gas through a charcoal mass to adsorb therewith any noble gases as may be present in the gas mixture.

8. The method of claim 7 in which the charcoal mass is maintained at a low temperature.

9. The method of claim 1 in which the gas removed from the wetwell is directed upwardly of the containment in a confined gas velocity enhancing flow course having an outlet to atmosphere substantially elevated above the containment.

10. The method of claim 9 in which exhausting of gas from the wetwell is a forced draft-induced flow.

11. The method of claim 9 in which exhausting of gas from the wetwell is a natural draft-induced flow.

12. The method of claim 11 in which thermal energy is supplied to the gas flow at least one location along said flow course to provide draft assist to said flow.

13. The method of claim 1 in which gas is exhausted from to the wetwell at rates which are effective to control pressure in the drywell upon happening of a loss-of-coolant event in the nuclear reactor to not exceed about one atmosphere gauge pressure.

14. In a nuclear system comprising a nuclear reactor which includes a reactor pressure vessel, and a reactor core situated in said pressure vessel, means enclosing space defining a containment in which the nuclear reactor is disposed, the containment including a drywell space, structure in said containment for holding a suppression pool of water and defining a wetwell space above a level of said water, with the wetwell space separated from the drywell space, means for maintaining a continuous exhaust flow of gas mixture from said wetwell space to remove gas mixture therefrom, means for continuously admitting air from an atmospheric source thereof to said wetwell space during normal operation but such means being operable to block air admission to the wetwell space during a loss-of-coolant-accident whenever a pressure in the wetwell is above a predetermined value, conduit means communicating at an entry end thereof with said wetwell space and extending to an opposite outlet end thereof located exteriorly remote from said containment and elevated above the containment, and gas treatment means disposed in said conduit means for treating the gas to separate any particulate matter entrained therein from said gas.

15. The nuclear system of claim 14 in which the gas treatment means comprises a filter unit containing a gravel bed through which the gas passes.

16. The nuclear system of claim 15 in which the gravel in bed thereof is of pebble size.

17. The nuclear system of claim 14 in which the gas treatment means comprises a filter unit containing a particulate form of one of zeolite or synthetic zeolite.

18. The nuclear system of claim 14 in which the gas treatment means comprises a mesh number through which the gas passes, and means for continuously wetting the mesh with a fission particle absorbing solution.

19. The nuclear system of claim 14 further comprising additional gas treatment means disposed in said conduit means downstream of said first gas treatment means for adsorbing any noble gas as may be present in the gas mixture.

20. The nuclear system of claim 19 in which said additional gas mixture treatment means comprises a charcoal mass.

21. The nuclear system of claim 20 further comprising means for maintaining said charcoal mass at or near cryogenic temperature.

22. The nuclear system of claim 21 in which said cryogenic temperature maintaining means comprises a source of liquified cryogenic gas, and means operable upon occurrence of a predetermined event for passing said liquified cryogenic gas through said charcoal mass in heat exchange relationship therewith.

23. The nuclear system of claim 14 in which the drywell space includes a lower space region, the suppression pool structure including a pool wall encircling said lower space region, a vent duct member disposed in said lower space region and with the pool wall defining an annular venting channel for establishing the flow path by which flow of any heated fluids present in the drywell incident a loss-of-coolant-accident can pass from the drywell into the pool of water, there being openings in the pool wall below the pool water level communicating the pool with the venting channel.

24. The nuclear system of claim 23 in which at least a portion of the reactor pressure vessel is disposed in said lower space region, said vent duct member encircling said pressure vessel portion.

25. The nuclear system of claim 23 further comprising and disposed within said containment, a steam turbine unit, a steam condenser for receiving steam exhaust from the turbine unit, and feedwater means for conveying a condensate of said steam exhaust to said pressure vessel.

26. The nuclear system of claim 14 in which a terminal section of said conduit means comprises a venting stack.

27. The nuclear system of claim 26 in which the wetwell exhaust flow maintenance means comprises a forced draft fan unit disposed in said conduit means, the atmospheric air admitting means comprising inlets in said suppression pool structure.

28. The nuclear system of 26 further comprising a torch unit disposed in said stack and operable to burn a fuel thereby to release thermal energy in the stack for providing draft assist to gas flowing from the wetwell.

29. The nuclear system of claim 27 in which said conduit means is sized such that flow therethrough is at a rate sufficient to control pressure in the drywell upon happening of a loss-of-coolant accident to not exceed about one atmosphere gauge pressure.

30. A nuclear system comprising an array of operating components including,
   a nuclear reactor having a reactor pressure vessel, and a reactor core in the vessel,
   a turbine unit,
   a condenser receiving an exhaust of steam from the turbine unit and converting it to a condensate,
   means for feeding a flow of condensate to the reactor vessel, all said operating components being disposed in a common containment drywell space defined by an enclosure structure, the enclosure structure including a structure part comprising a suppression pool housing separated from the drywell space,
   said housing containing a pool of water, there being a wetwell space in said housing above a level of the water pool,
   means defining a flow connection between said drywell space and a submerged location in said water pool,
   means for maintaining a continuous exhaust flow of gas mixture from the wetwell space to remove gas mixture therefrom,
   means for continuously admitting atmospheric air from a source thereof to said wetwell space during normal operation but such means being operable to block air admission to the wetwell space during a loss-of-coolant-accident whenever pressure in the wetwell space is above a predetermined value,
   conduit means communicating at an entry end thereof with the wetwell space and extending to an outlet end located exteriorly of the containment, and
   gas treatment means disposed in said conduit means for treating the gas to separate any particulate matter entrained therein from the gas.

31. The nuclear system of claim 30 in which said housing is of elongated but narrowed lateral expanse, the means for admitting atmospheric air to the wetwell comprising an inlet vent means disposed at an end of the housing, the conduit means entry end having communication with the wetwell space at an opposite end of the housing, whereby whenever said inlet valve means is admitting air to the wetwell space, the ventilating flow in the wetwell space sweeps that space from end-to-end thereof.

32. The nuclear system of claim 31 further comprising forced draft flow imposing means disposed in said conduit means.

33. The nuclear system of claim 27 further comprising an conduit bypass leg extending in flow course bypass of the forced draft fan to therewith bypass gas flow through the fan during a loss-of-coolant-accident whenever the pressure in the wetwell space exceeds a predetermined value.

34. The nuclear space of claim 33 further comprising a normally closed pre-loaded check valve disposed in said bypass leg, said valve operable to open responsive to pressure in said wetwell space in excess of said predetermined value.

* * * * *